US 8,908,002 B1

(12) United States Patent
Yoshida et al.

(10) Patent No.: US 8,908,002 B1
(45) Date of Patent: Dec. 9, 2014

(54) OPTICAL SCANNING DEVICE AND IMAGE FORMING APPARATUS THEREWITH

(71) Applicant: KYOCERA Document Solutions Inc., Osaka (JP)

(72) Inventors: Shingo Yoshida, Osaka (JP); Chika Sawamoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/284,002

(22) Filed: May 21, 2014

(30) Foreign Application Priority Data

May 30, 2013 (JP) ................................. 2013-113766

(51) Int. Cl.
*B41J 2/435* (2006.01)
*B41J 27/00* (2006.01)
*B41J 2/47* (2006.01)

(52) U.S. Cl.
CPC .......................................... *B41J 2/47* (2013.01)
USPC ........... 347/250; 347/235; 347/258; 347/259; 347/260; 347/261; 347/263

(58) Field of Classification Search
USPC ........................... 347/235, 250, 258–261, 263
See application file for complete search history.

(56) References Cited

U.S. PATENT DOCUMENTS 5,173,798 A * 12/1992 Naiki .......................... 359/216.1
2002/0030158 A1 * 3/2002 Kodama ........................ 250/235

FOREIGN PATENT DOCUMENTS

JP 2006-267701 A 10/2006
JP 2006267701 A * 10/2006

* cited by examiner

*Primary Examiner* — Sarah Al Hashimi
(74) *Attorney, Agent, or Firm* — Stein IP, LLC

(57) ABSTRACT

An optical scanning device has a light deflector deflecting a light beam from a light source, a synchronization detection sensor determining timing of starting scanning in main scanning direction based on timing of detecting the light beam scanned in main scanning direction by the light deflector, and a pre-sensor imaging optical system imaging the light beam reflected from the light deflector on the synchronization detection sensor. The pre-sensor imaging optical system moves the imaging position of the light beam on the synchronization detection sensor in a direction making the timing of detecting the light beam earlier or later according to whether variation in temperature causes the magnification of the scanning optical system in main scanning direction to increase or decrease respectively.

4 Claims, 4 Drawing Sheets

OPTICAL SCANNING DEVICE AND IMAGE FORMING APPARATUS THEREWITH

CROSS-REFERENCE TO RELATED APPLICATIONS

This application is based upon and claims the benefit of priority from the corresponding Japanese Patent Application No. 2013-113766, filed on May 30, 2013, the entire contents of which are incorporated herein by reference.

BACKGROUND OF THE INVENTION

The present disclosure relates to optical scanning devices for use in image forming apparatuses such as digital copiers, laser printers, and laser facsimile machines, and to image forming apparatuses provided with such optical scanning devices.

In general, an optical scanning device is so configured that a light beam emitted from a beam light source device (LD unit) having a laser light-emitting portion (hereinafter "LD") is directed through a scanning optical system composed of a collimator lens, a cylindrical lens, a deflector such as a polygon mirror, a scanning lens, etc. to be imaged as a beam spot on a scanned surface, while the deflector makes the light beam scan across the scanned surface at a constant speed in the main scanning direction.

There is also provided a synchronization detection sensor (hereinafter "BD sensor") for detecting the beam deflected by the deflector. Based on the result of detection by the BD sensor, a write clock is varied, thereby to correct the timing with which to start scanning in the main scanning direction with the light beam deflected by the deflector.

In such an optical scanning device, variation in the environmental temperature or the like causes variation in the refractive index of a lens, and hence variation in the characteristics of a scanning lens and the like, and this causes problems such as inconstancy in magnification (in scanning magnification) and wavy vertical lines, leading to degraded image quality. Specifically, due to variation in the refractive index of the scanning lens, a rise in the environmental temperature causes the scanning width to increase, and a drop in the environmental temperature causes the scanning width to decrease. As mentioned above, the scanning of the scanned surface by the optical scanning device is started after the detection of the light beam by the BD sensor. Thus, variation in the scanning width tends to appear at the scanning-end side. This makes variation in the printing position of an image on a recording medium notable.

As a solution, there has been proposed a method of correcting an error in magnification resulting from variation in the environmental temperature. In a known optical scanning device, a write-out detection mirror (SOS mirror) is rotated according to variation in the environmental temperature so as to correct the timing of detection of a light beam by the write-out detection mirror (SOS mirror), thereby to distribute an error in magnification between the scanning-start and scanning-end sides. Specifically, when the temperature inside the cabinet rises, the write-out detection mirror is rotated about its pivot in the direction in which a synchronizing signal is detected earlier so that detection of the light beam by the write-out detection mirror takes place earlier, and thereby printing is started with earlier timing.

SUMMARY OF THE INVENTION

According to one aspect of the present disclosure, an optical scanning device is provided with a light source, a light deflector, a scanning optical system, a synchronization detection sensor, and a pre-sensor imaging optical system. The light deflector deflects the light beam emitted from the light source. The scanning optical system images, in an effective exposure region on a scanned surface, the light scanned by the light deflector in the main scanning direction. The synchronization detection sensor detects, outside the effective exposure region, the light beam scanned by the light deflector in the main scanning direction, and determines, based on the timing with which the light beam is detected, the timing with which scanning in the main scanning direction is started. The pre-sensor imaging optical system is arranged in the optical path of the light beam between the light deflector and the synchronization detection sensor, and images, on the synchronization detection sensor, the light beam reflected from the light deflector. Here, at least one of the refractive index and radius of curvature of the pre-sensor imaging optical system varies such that, when variation in temperature causes the magnification of the scanning optical system in the main scanning direction to increase, the imaging position of the light beam on the synchronization detection sensor moves in such a direction as to make the timing with which the light beam is detected earlier and, when variation in temperature causes the magnification of the scanning optical system in the main scanning direction to decrease, the imaging position of the light beam on the synchronization detection sensor moves in such a direction as to make the timing with which the light beam is detected later.

Further features and advantages of the present disclosure will become apparent from the description of embodiments given below.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
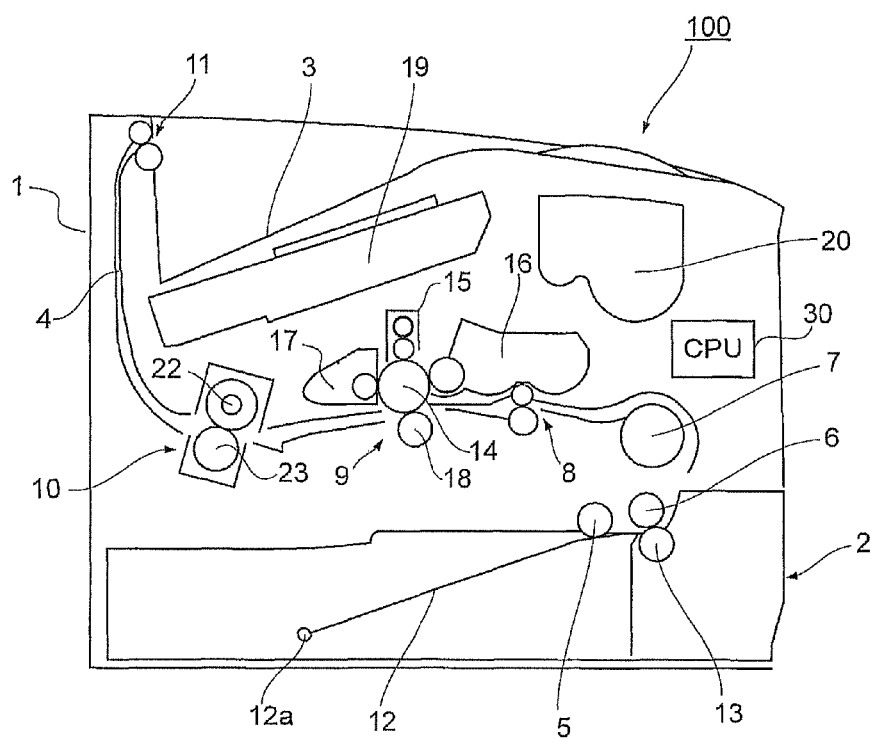
FIG. 1 is a schematic sectional view of an image forming apparatus 100 incorporating an exposure device 19 as an optical scanning device according to the present disclosure.

Hereinafter, embodiments of the present disclosure will be described in detail with reference to the accompanying drawings. FIG. 1 is a schematic diagram showing an overall construction of an image forming apparatus 100 provided with an exposure device 19 as an optical scanning device according to the present disclosure, the right side of the diagram corresponding to the front side of the image forming apparatus 100. As shown in FIG. 1, the image forming apparatus 100 (here, a monochrome printer) is provided with a paper feed cassette 2 containing a stack of sheets of paper in a lower part of the apparatus main body 1. Over the paper feed cassette 2, a paper transport passage 4 is formed which extends substantially horizontally from the front side to the rear side of the apparatus main body 1 and then upward to reach a paper discharge section 3 formed in a top face of the apparatus main body 1. Along the paper transport passage 4, there are arranged, from an upstream side, a pickup roller 5, a feed roller 6, an intermediary transport roller 7, a registration roller pair 8, an image forming section 9, a fusing device 10, and a discharge roller pair 11. Inside the image forming apparatus 100, a control section (CPU) 30 is arranged for controlling the operation of the respective rollers mentioned above, the image forming section 9, the fusing device 10, the exposure device, etc.

The paper feed cassette 2 is provided with a paper placement plate 12, which is supported on a pivot 12a provided in a rear end part in a paper transport direction so as to be swingable with respect to the paper feed cassette 2. The stack of sheets of paper (recording medium) on the paper placement plate 12 is pressed against by the pickup roller 5. In a front part of the paper feed cassette 2, a return roller 13 is arranged in pressed contact with the feed roller 6. When a plurality of sheets are simultaneously fed out by the pickup roller 5, they are separated by the feed roller 6 and the return roller 13 so that only the topmost one sheet is transported further.

The sheet singled out by the feed roller 6 and the return roller 13 then has its transport direction changed toward the rear side of the apparatus, and is transported to the registration roller pair 8. The registration roller pair 8 then feeds, with adjusted timing, the sheet to the image forming section 9.

The image forming section 9 forms a predetermined toner image on paper by an electrophotographic process. The image forming section 9 is composed of a photosensitive drum 14, which is an image carrying body pivoted to be rotatable in the clockwise direction in FIG. 1; a charging device 15, a developing device 16, and a cleaning device 17, which are arranged around the photosensitive drum 14; a transfer roller 18, which is arranged to face the photosensitive drum 14 across the paper transport passage 4; and an exposure device (LSU) 19, which is arranged over the photosensitive drum 14. Over the developing device 16, a toner container 20 is arranged for supplying toner to the developing device 16.

In this embodiment, the photosensitive drum 14 is an amorphous silicon (a-Si) photosensitive body, in which on an electrically conductive substrate (cylindrical body), a photoconductive layer based on a-Si is formed as a photosensitive layer, and on the top face of it, a surface protection layer is stacked that is formed of an inorganic insulator or an inorganic semiconductor such as SiC, SiN, SiO, SiON, or SiCN.

When image data is fed to the image forming apparatus from a host device such as a personal computer, first, the charging device 15 electrically charges the surface of the photosensitive drum 14 uniformly. Next, the exposure device (LSU) 19 emits a laser beam to form, on the photosensitive drum 14, an electrostatic latent image based on the image data fed in. Then, the developing device 16 deposits toner on the electrostatic latent image to form a toner image on the surface of the photosensitive drum 14. The toner image formed on the surface of the photosensitive drum 14 is then transferred to paper fed into a nip portion (transfer position) between the photosensitive drum 14 and the transfer roller 18.

The paper having the toner image transferred to it in the image forming section 9 is then separated from the photosensitive drum 14, and is transported toward the fusing device 10. The fusing device 10 is arranged on the downstream side of the image forming section 9 with respect to the paper transport direction. Thus, the paper having the toner image transferred to it is heated and pressed by a heating roller 22, which is provided in the fusing device 10, and a pressing roller 23, which is in pressed contact with the heating roller 22, so that the toner image transferred to the paper is fused. The paper thus having undergone image formation in the image forming section 9 and fusing device 10 is discharged to the paper discharge section 3 by the discharge roller pair 11.

After transfer, the toner remaining on the surface of the photosensitive drum 14 is removed by the cleaning device 17, and the electric charge remaining on the surface of the photosensitive drum 14 is destaticized by a destaticizer (not shown). The photosensitive drum 14 is then electrically charged by the photosensitive drum 14 again so that image formation proceeds likewise.

Figure 2:
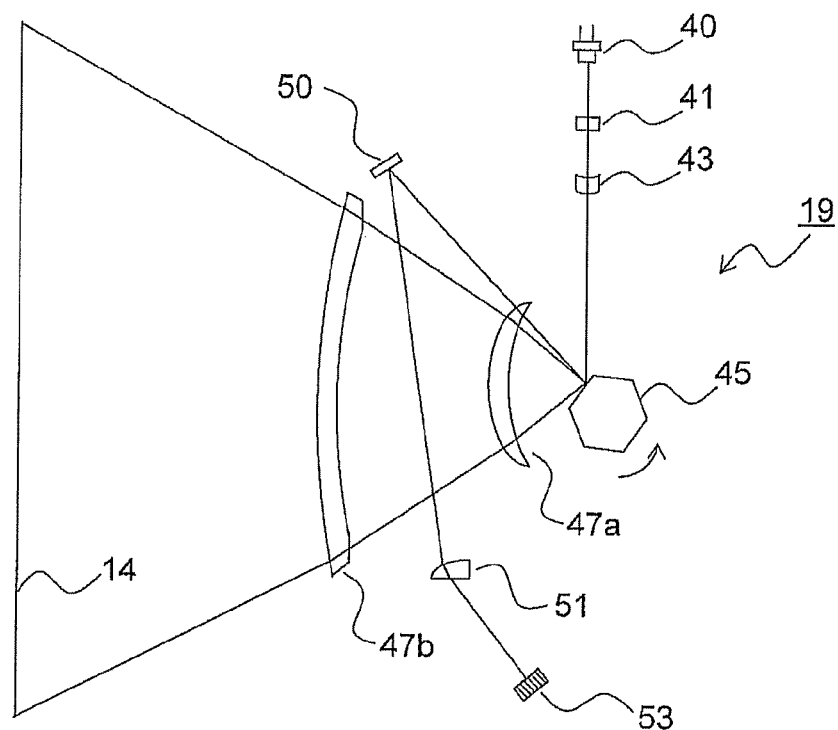
FIG. 2 is a main scanning sectional view schematically showing an internal construction of an exposure device 19 according to a first embodiment of the present disclosure.

FIG. 2 is a main scanning sectional view schematically showing an internal construction of the exposure device 19 according to a first embodiment of the present disclosure. As shown in FIG. 2, the exposure device 19 is provided with an LD unit 40, a collimator lens 41, a cylindrical lens 43, a polygon mirror 45, scanning lenses 47a and 47b, a planar mirror 50, an SOS (start-of-scan) lens 51, and a BD sensor 53.

The LD unit 40 is provided with a laser diode (LD) as a light source, and emits a light beam (laser beam) resulting from optical modulation based on an image signal. The collimator lens 41 forms the laser beam emitted from the LD unit 40 into a substantially parallel beam. The cylindrical lens 43 has a predetermined refractive power only in a sub scanning direction of the laser beam. The parallel beam having passed through the collimator lens 41 and entered the cylindrical lens 43 exits from it in the form of a convergent beam in the sub scanning direction while remaining a parallel beam in a main scanning section, and is imaged as a linear image on a deflecting surface (reflective surface) of the polygon mirror 45.

The polygon mirror 45 is a rotary multiple-face mirror in the shape of a regular polygon (here, a regular hexagon) having a plurality of deflecting surfaces (reflective surfaces) as side faces, and is rotated at a predetermined speed in the counter-clockwise direction in FIG. 2 by a driving means (not shown) such as a motor. The scanning lenses 47a and 47b are lenses having fθ characteristics. The laser beam reflection-deflected by the polygon mirror 45 is, through the scanning lenses 47a and 47b, imaged as a spot with a predetermined size on the photosensitive drum 14, and this achieves scanning in the main scanning direction (from top to bottom in FIG. 2).

Outside the effective exposure region, at the scanning-start side is arranged the planar mirror 50, and at the scanning-end side are arranged the SOS lens 51 and the BD sensor 53. The laser beam having been deflected by the polygon mirror 45, then passed through an end part of the scanning lens 47a, and then been reflected by the planar mirror 50 then passes through the SOS lens 51 and enters the BD sensor 53. In phase with the timing with which the BD sensor 53 detects the laser beam, the BD sensor 53 outputs a signal to a time counting portion (not shown). The BD sensor 53 can be one of various optical sensors, such as a photodiode, a phototransistor, or a photo IC. Although in FIG. 2 the BD sensor 53 is arranged at the scanning-end side outside the effective exposure region of the photosensitive drum 14 (scanned surface), the BD sensor 53 can instead be arranged at the scanning-start side or anywhere else so long as it does not affect the scanning of the scanned surface.

Figure 3:
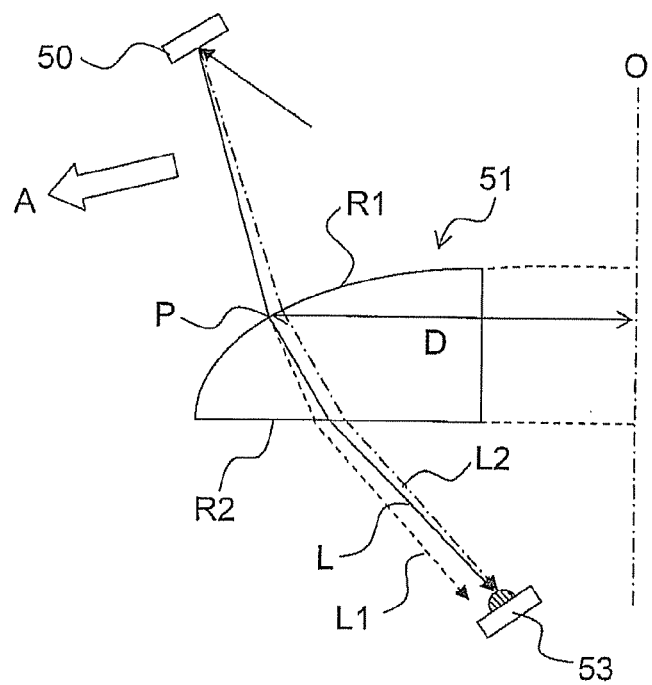
FIG. 3 is a side view showing how a rise in the environmental temperature causes the optical path of a laser beam L imaged on a BD sensor 53 to shift in an exposure device 19 according to the first embodiment.
Figure 4:
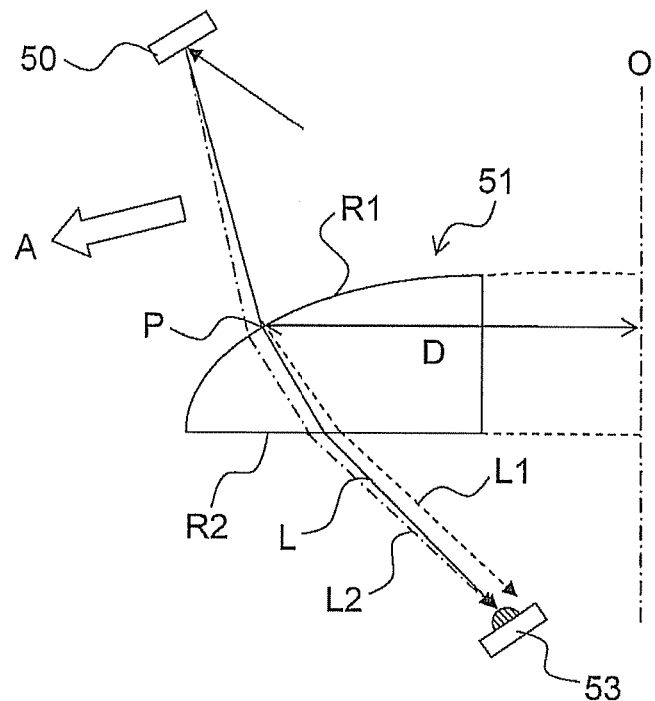
FIG. 4 is a side view showing how a drop in the environmental temperature causes the optical path of a laser beam L imaged on a BD sensor 53 to shift in an exposure device 19 according to the first embodiment.

FIGS. 3 and 4 are side views showing how the laser beam reflected from the planar mirror 50 passes through the SOS lens 51 and enters the BD sensor 53. As the SOS lens 51, an aspherical lens having a positive power is used. It is possible to use as the SOS lens 51 a spherical lens having a positive power, but it then produces spherical aberration in the laser beam. It is thus preferable to use an aspherical lens that corrects spherical aberration. Also, using an aspherical lens helps reduce the size of the SOS lens 51, and thus, also from the viewpoint of compactness of the exposure device 19, it is preferable to use an aspherical lens.

Suppose that the laser beam L that emanates from the planar mirror 50, then enters the SOS lens 51 through a surface R1, then exits from it through a surface R2, and is imaged on the BD sensor 53 enters the SOS lens 51 at a point of entrance P. Then, in this embodiment, the optical axis O of the SOS lens 51 is offset, with respect to the point of entrance P, in the direction opposite from the advancing direction (the direction indicated by arrow A in the diagrams) in the main scanning direction. The distance (optical axis offset) from the optical axis O of the SOS lens 51 to the point of entrance P of the laser beam L is, for example, 20 mm. The light entrance surface (surface R1) of the SOS lens 51 is, for example, an aspherical surface with a radius of curvature of 21.075 mm and a conic constant of −0.725, and the light exit surface (surface R2) of the SOS lens 51 is a flat surface.

Next, a description will be given of how the timing with which the BD sensor 53 detects the laser beam is adjusted by the SOS lens 51. As the environmental temperature rises, the refractive index and radius of curvature of the SOS lens 51 vary such that the positive power of the SOS lens 51 decreases. Here, the radius of curvature varies as the volume of the lens increases with variation in temperature, and the refractive index varies according to the temperature coefficient of refractive index variation. Thus, theoretically, both the refractive index and the radius of curvature vary with variation in temperature. Usually, the positive power of the SOS lens 51 is affected more by the refractive index, though depending on the material of the lens.

Accordingly, as shown in FIG. 3, the laser beam L which would be imaged on the BD sensor 53 in a room-temperature environment now becomes a laser beam L1 having an optical path shifted in the advancing direction (the direction indicated by arrow A) in the main scanning direction. Thus, a laser beam L2 that has entered the SOS lens 51 with earlier timing than the laser beam L is imaged on the BD sensor 53. That is, the detection by the BD sensor 53 takes place with earlier timing.

On the other hand, as the environmental temperature falls, the refractive index and radius of curvature of the SOS lens 51 vary such that the positive power of the SOS lens 51 increases. Thus, as shown in FIG. 4, the laser beam L which would be imaged on the BD sensor 53 in a room-temperature environment now becomes a laser beam L1 having an optical path shifted in the direction opposite to the advancing direction in the main scanning direction. Thus, a laser beam L2 that enters the SOS lens 51 with later timing than the laser beam L is imaged on the BD sensor 53. That is, the detection by the BD sensor 53 takes place with later timing.

In this way, when the environmental temperature rises and the magnification of the scanning lenses 47a and 47b in the main scanning direction increases, the timing of the detection by the BD sensor 53 can be made earlier so that scanning is started with earlier timing. By contrast, when the environmental temperature falls and the magnification of the scanning lenses 47a and 47b in the main scanning direction decreases, the timing of the detection by the BD sensor 53 can be made later so that scanning is started with later timing. That is, variation in the magnification in the main scanning direction (variation in the scanning width) resulting from variation in the environmental temperature can be distributed between the scanning-start and scanning-end sides. By distributing variation in the magnification in the main scanning direction between the scanning-start and scanning-end sides in this way, it is possible to suppress image displacement on the recording medium.

Figure 5:
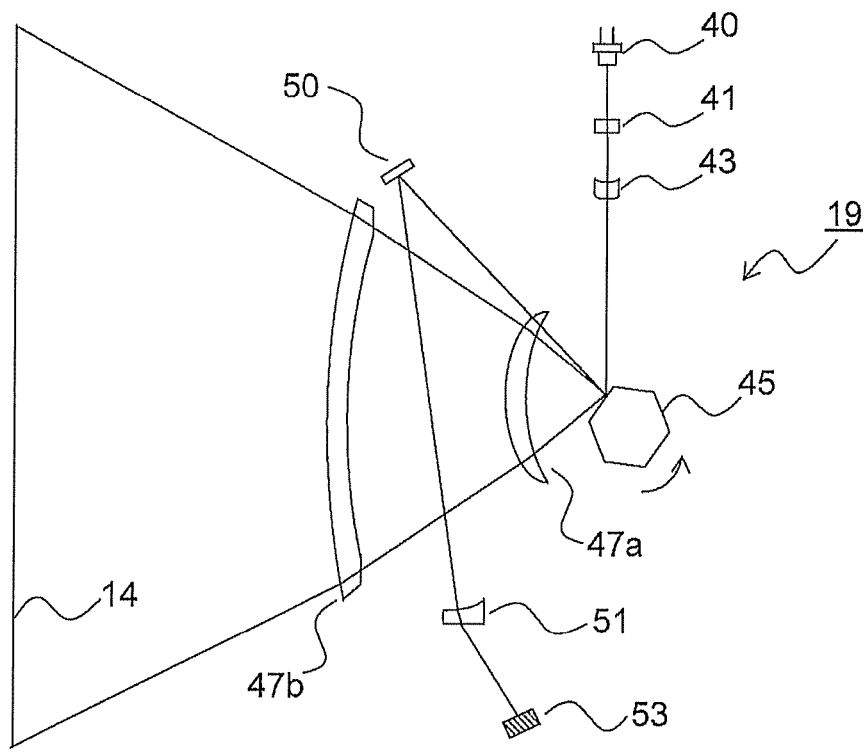
FIG. 5 a main scanning sectional view schematically showing an internal construction of an exposure device 19 according to a second embodiment of the present disclosure.
Figure 6:
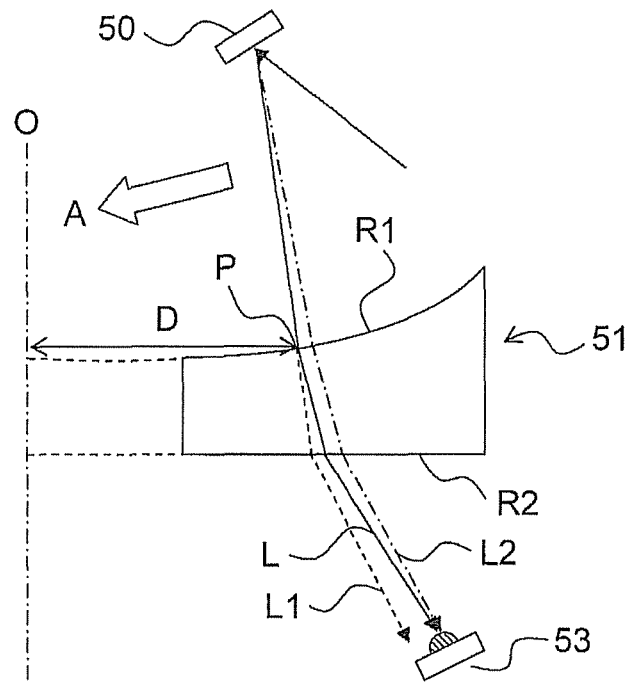
FIG. 6 is a side view showing how a rise in the environmental temperature causes the optical path of a laser beam L imaged on a BD sensor 53 to shift in an exposure device 19 according to the second embodiment.
Figure 7:
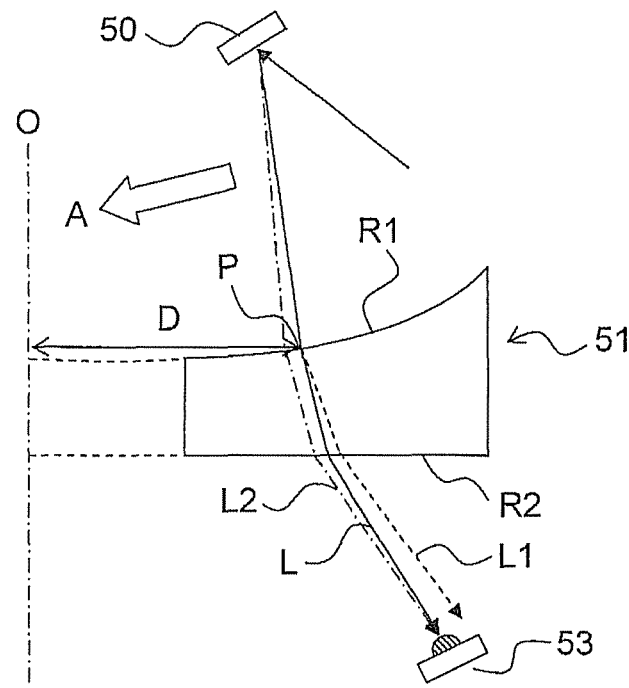
FIG. 7 is a side view showing how a drop in the environmental temperature causes the optical path of a laser beam L imaged on a BD sensor 53 to shift in an exposure device 19 according to the second embodiment.

FIG. 5 is a main scanning sectional view schematically showing an internal construction of the exposure device 19 in a second embodiment of the present disclosure. FIGS. 6 and 7 are side views showing how the laser beam reflected from the planar mirror 50 passes through the SOS lens 51 and enters the BD sensor 53.

In this embodiment, as the SOS lens 51, an aspherical lens having a negative power is used. The optical axis O of the lens is offset, with respect to the point of entrance P, in the advancing direction (the direction indicated by arrow A in the diagrams) in the main scanning direction. The distance (optical axis offset) from the optical axis O of the SOS lens 51 to the point of entrance P of the laser beam L is, for example, 20 mm. The light entrance surface (surface R1) of the SOS lens 51 is, for example, an aspherical surface with a radius of curvature of 21.075 mm and a conic constant of −0.725, and the light exit surface (surface R2) of the SOS lens 51 is a flat surface. In other respects, the exposure device 19 here is configured similarly as that in the first embodiment. It is possible to use as the SOS lens 51 a spherical lens having a negative power, but from the viewpoints of spherical aberration correction and compactness of the exposure device 19, it is preferable to use an aspherical lens.

Next, a description will be given of how the timing with which the BD sensor 53 detects the laser beam is adjusted by the SOS lens 51. As the environmental temperature rises, the refractive index and radius of curvature of the SOS lens 51 vary such that the negative power of the SOS lens 51 decreases.

Accordingly, as shown in FIG. 6, the laser beam L which would be imaged on the BD sensor 53 in a room-temperature environment now becomes a light beam L1 having an optical path shifted in the advancing direction (the direction indicated by arrow A) in the main scanning direction. Thus, a laser beam L2 that has entered the SOS lens 51 with earlier timing than the laser beam L is imaged on the BD sensor 53. That is, the detection by the BD sensor 53 takes place with earlier timing.

On the other hand, as the environmental temperature falls, the refractive index and radius of curvature of the SOS lens 51 vary such that the positive power of the SOS lens 51 increases. Thus, as shown in FIG. 7, the laser beam L which would be imaged on the BD sensor 53 in a room-temperature environment now becomes a laser beam L1 having an optical path shifted in the direction opposite to the advancing direction in the main scanning direction. Thus, a laser beam L2 that enters the SOS lens 51 with later timing than the laser beam L is imaged on the BD sensor 53. That is, the detection by the BD sensor 53 takes place with later timing.

In this way, as in the first embodiment, when the environmental temperature rises and the magnification of the scanning lenses 47a and 47b in the main scanning direction increases, the timing of the detection by the BD sensor 53 can be made earlier so that scanning is started with earlier timing.

By contrast, when the environmental temperature falls and the magnification of the scanning lenses 47a and 47b in the main scanning direction decreases, the timing of the detection by the BD sensor 53 can be made later so that scanning is started with later timing. That is, variation in the magnification in the main scanning direction (variation in the scanning width) resulting from variation in the environmental temperature can be distributed between the scanning-start and scanning-end sides.

As the environmental temperature varies, the refractive index and radius of curvature of the scanning lens 47a also vary. As shown in FIGS. 2 and 5, the laser beam reflected from the planar mirror 50 passes through the scanning lens 47a in an end part thereof. Thus, the optical path of the laser beam that is imaged on the BD sensor 53 shifts with variation in the refractive index and radius of curvature of the scanning lens 47a. Specifically, as the magnification of the scanning lenses 47a and 47b in the main scanning direction increases, the optical path shifts so as to make the detection timing of the BD sensor 53 earlier. By contrast, as the magnification of the scanning lenses 47a and 47b in the main scanning direction decreases, the optical path shifts so as to make the detection timing of the BD sensor 53 later.

However, varying the detection timing of the BD sensor 53 with variation in the refractive index and the radius of curvature of the scanning lens 47a is not sufficient to distribute variation in the magnification in the main scanning direction between the scanning-start and scanning-end sides. This is the reason that the SOS lens 51 needs to be arranged between the scanning lens 47a and the BD sensor 53.

The embodiments described above are in no way meant to limit the scope of the present disclosure, which thus allows for many modifications and variations without departing from the spirit of the present disclosure. For example, although in the embodiments described above a single SOS lens 51 is used to adjust the detection timing of the BD sensor 53, it is also possible to use as the SOS lens 51 a compound lens composed of two or more lenses.

Although the embodiments described above deal with a single-beam scanning device provided with a single LD, the present disclosure is equally applicable to a multiple-beam scanning device provided with a plurality of LDs.

Needless to say, an optical scanning device according to the present disclosure is applicable not only to a monochrome printer as shown in FIG. 1 but to any other image forming apparatus that employs an exposure device, such as a monochrome copier, color copier, color printer, digital multifunction peripheral, and facsimile machine. For example, by applying the present disclosure to a color image forming apparatus that employs a multiple-beam scanning device, it is possible to distribute variation in the magnification in the main scanning direction (variation in the scanning width) of each of the laser beams emitted from a plurality of LDs between the scanning-start and scanning-end sides, and thereby to effectively suppress color displacement that results from displacement among images of different colors composing a full-color image.

The present disclosure finds application in optical scanning devices that detect scanning start timing by use of a synchronization detection sensor. According to the present disclosure, it is possible to provide an optical scanning device that permits variation in the magnification in the main scanning direction resulting from variation in the environmental temperature to be distributed between the scanning-start and scanning-end sides with a simple construction using an SOS lens.

What is claimed is:

1. An optical scanning device comprising:
a light source which emits a light beam;
a light deflector which deflects the light beam emitted from the light source;
a scanning optical system which images, in an effective exposure region on a scanned surface, the light scanned by the light deflector in a main scanning direction;
a synchronization detection sensor which detects, outside the effective exposure region, the light beam scanned by the light deflector in the main scanning direction and which determines, based on timing with which the light beam is detected, timing with which scanning in the main scanning direction is started; and
a pre-sensor imaging optical system which is arranged in an optical path of the light beam between the light deflector and the synchronization detection sensor and which images, on the synchronization detection sensor, the light beam reflected from the light deflector,
wherein
the pre-sensor imaging optical system comprises a lens having a positive power of which a light entrance surface is a convex aspherical surface and of which a light exit surface is a flat surface, the lens refracting the light beam passing therethrough in a direction opposite to an advancing direction of the light beam in the main scanning direction, and
the pre-sensor imaging optical system operates such that
when variation in temperature causes magnification of the scanning optical system in the main scanning direction to increase, an imaging position of the light beam on the synchronization detection sensor moves in such a direction as to make the timing with which the light beam is detected earlier, and
when variation in temperature causes the magnification of the scanning optical system in the main scanning direction to decrease, the imaging position of the light beam on the synchronization detection sensor moves in such a direction as to make the timing with which the light beam is detected later.

2. An image forming apparatus comprising the optical scanning device according to claim 1.

3. An optical scanning device comprising:
a light source which emits a light beam;
a light deflector which deflects the light beam emitted from the light source;
a scanning optical system which images, in an effective exposure region on a scanned surface, the light scanned by the light deflector in a main scanning direction;
a synchronization detection sensor which detects, outside the effective exposure region, the light beam scanned by the light deflector in the main scanning direction and which determines, based on timing with which the light beam is detected, timing with which scanning in the main scanning direction is started; and
a pre-sensor imaging optical system which is arranged in an optical path of the light beam between the light deflector and the synchronization detection sensor and which images, on the synchronization detection sensor, the light beam reflected from the light deflector,
wherein
the pre-sensor imaging optical system comprises a lens having a negative power of which a light entrance surface is a concave aspherical surface and of which a light exit surface is a flat surface, the lens refracting the light beam passing therethrough in a direction opposite to an advancing direction of the light beam in the main scanning direction, and the pre-sensor imaging optical system operates such that
when variation in temperature causes magnification of the scanning optical system in the main scanning direction to increase, an imaging position of the light beam on the synchronization detection sensor moves in such a direction as to make the timing with which the light beam is detected earlier, and when variation in temperature causes the magnification of the scanning optical system in the main scanning direction to decrease, the imaging position of the light beam on the synchronization detection sensor moves in such a direction as to make the timing with which the light beam is detected later.

4. An image forming apparatus comprising the optical scanning device according to claim 3.

* * * * *